(12) United States Patent
Hutchison

(10) Patent No.: US 6,933,466 B2
(45) Date of Patent: Aug. 23, 2005

(54) METHOD AND APPARATUS FOR ARC WELDING WITH WIRE HEAT CONTROL

(75) Inventor: Richard M. Hutchison, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 160 days.

(21) Appl. No.: 10/434,445

(22) Filed: May 8, 2003

(65) Prior Publication Data

US 2004/0222204 A1 Nov. 11, 2004

(51) Int. Cl.$^7$ ............................................... B23K 9/095
(52) U.S. Cl. ........................... 219/137 PS; 219/130.21
(58) Field of Search ................. 219/137 PS, 130.21, 219/130.32, 130.33, 130.51

(56) References Cited

U.S. PATENT DOCUMENTS

| 5,001,326 | A | | 3/1991 | Stava |
| 5,003,154 | A | * | 3/1991 | Parks et al. ............ 219/137 PS |
| 6,087,626 | A | | 7/2000 | Hutchison et al. |
| 6,326,591 | B1 | | 12/2001 | Hutchinson et al. |
| 6,329,636 | B1 | | 12/2001 | Geissler |

* cited by examiner

*Primary Examiner*—Clifford C. Shaw
(74) *Attorney, Agent, or Firm*—George R. Corrigan

(57) ABSTRACT

A method and apparatus for controlled short circuit welding includes providing welding-type power and controlling the welding-type power to be controlled short circuit power. A user selectable heat control input is received and the heat content of a drop, each drop, or a plurality of drops is adjusted in response thereto.

22 Claims, 2 Drawing Sheets

METHOD AND APPARATUS FOR ARC WELDING WITH WIRE HEAT CONTROL

FIELD OF THE INVENTION

The present invention relates generally to the art of welding power supplies. More specifically, it relates to welding power supplies and the control thereof for short circuit welding.

BACKGROUND OF THE INVENTION

There are many known welding processes, used in many different applications. One well known welding applications is controlled short circuit welding, which generally consists of alternating between an arc state and a short circuit, non-arc state. During the arc state the wire melts, and during the short circuit state the metal further melts and the molten metal is transferred from the end of the wire to the weld puddle. The metal transferred in one cycle is referred to herein as a drop, regardless of the size or shape of the portion of metal that is transferred. This process has many advantages, such as shorter arc length and less melting of the base plate.

Controlled short circuit welding includes waveform controlled short circuit welding and mechanically controlled short circuit welding. Waveform controlled short circuit welding controls the process by controlling the output voltage and current (the power waveform) to have desired values, such as those which will reduce spatter by reducing the pinch force (current) when the liquid-metal bridge of the short is about to break and establish an arc. Mechanically controlled short circuit welding controls the process by controlling the breaking of the short by retracting the wire (mechanically controlling the wire and process) and can reduce the current and/or voltage to a desired level before the wire is retracted.

Both the power source topology and the control scheme must be considered when designing a waveform controlled short circuit welding power supply. The power topology used must be fast enough to have a timely response to the chosen control scheme. The control should address three considerations: First, arc length must be properly controlled. Second, the burn-off (or mass deposition) rate must be appropriately controlled. Inappropriate burn-off rate will result in increased spatter. Third, spatter is also caused by too much power when the short is cleared, i.e., the transition from a short circuit to an arc. Thus, the power or current when the short clears must also be controlled. Also, when the short is about to clear must be detected (for waveform controlled short circuit welding).

Known waveform controlled short circuit welders often have a converter or inverter controlled to provide the desired output. Generally, they lower the current prior to the short clearing so that the current is low when the short clears and the arc forms. The current is lowered because the clearing can be an explosive event, and lower current reduces spatter. Such systems attempt to sense or predict the short ending, and lower the current in response thereto. For example, U.S. Pat. Nos. 6,087,626 and 6,326,591 to the present inventor (hereby incorporated by reference), describe a topology and control that are used for short arc welding. They predict the short clearing, and reduce the inverter output before the short clears.

Other waveform controlled short circuit welders include an output bypass switch that shunts a resistance between the power circuitry and the weld. This switch is used to lower the current faster than commanding the inverter (or other power circuit) can lower the current. An example of such a system is found in U.S. Pat. No. 5,001,326 (hereby incorporated by reference), as well as in a number of related patents. Switch 70 of that patent is referred to herein as an output bypass switch because it is on the output of the inverter, and allows the output current to be more quickly reduced than it would be by control of the power circuitry alone. Power circuits used with this sort of system include inverters and dc supplies.

Prior art control schemes typically allow the user to set the peak and background current, and the control scheme controls the output accordingly. While the user can adjust peak and background current, the user cannot adjust the heat content of the drops. To the extent the heat content is controlled, it is fixed by the particular control scheme. Some welds could be better performed if the heat could be adjusted. For example, more heat might be desired if the user determines the puddle has not properly wetted out. Or, less heat might be desired if there is too much penetration. Unfortunately, prior art control schemes only allow the user to indirectly adjust the heat content by adjusting current magnitudes.

Accordingly, a controlled short circuit welding system that allows the user to adjust the heat content of the drops is desirable. Preferably, a baseline heat content is established by the control scheme, and the user can increase or decrease the heat content.

SUMMARY OF THE PRESENT INVENTION

According to a first aspect of the invention a controlled short circuit welding-type power supply includes a source of welding-type power and a controlled short circuit controller, connected to the source. The controller has a heat control module having a heat control connected to a user selectable input.

According to a second aspect of the invention a method of controlled short circuit welding includes providing welding-type power and controlling the welding-type power to be controlled short circuit power. A user selectable heat control input is received and the heat content of a drop, each drop, or a plurality of drops is adjusted in response thereto.

The heat control module includes a comparator responsive to a signal indicative of heat provided to a drop and the heat control input, in one embodiment. The heat control module also includes a threshold module that receives a signal indicative of a baseline threshold and the heat control input, and provides a threshold to the comparator, in another embodiment.

The heat control module is comprised of digital circuitry, analog circuitry, and/or implemented with software in various embodiments.

The source of welding-type power includes an inverter, a converter, and/or an output bypass switch in various embodiments.

Other principal features and advantages of the invention will become apparent to those skilled in the art upon review of the following drawings, the detailed description and the appended claims.

Figure 1:
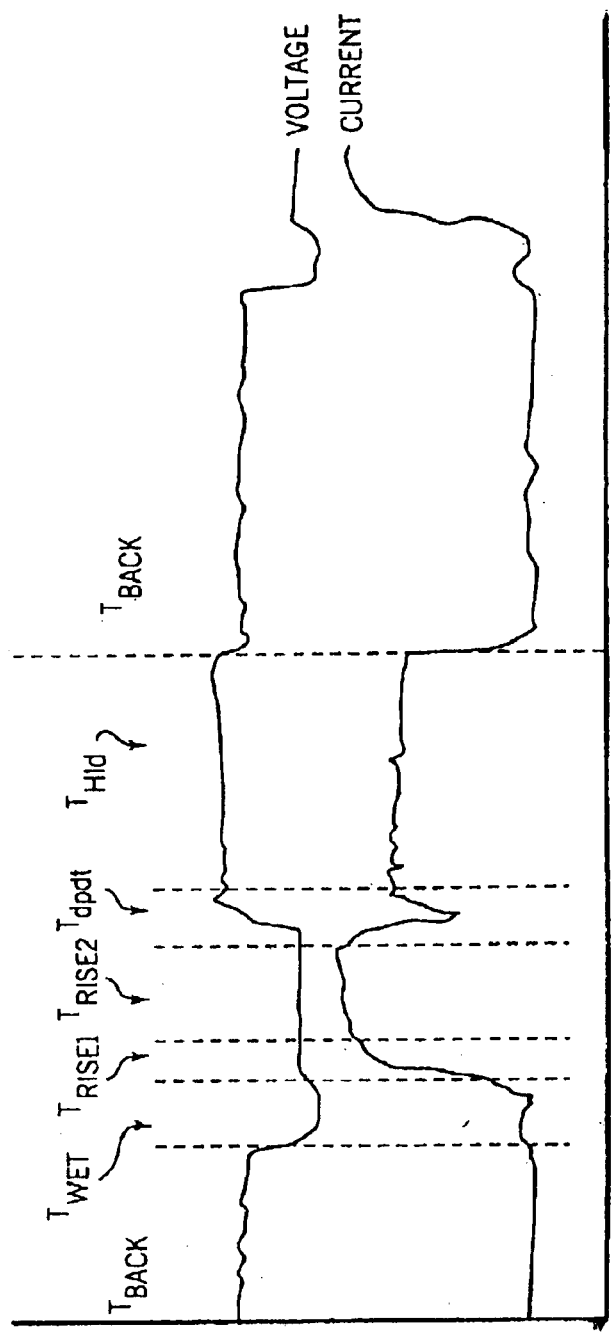
FIG. 1 is a graph showing current and voltage outputs for a controlled short circuit welding cycle.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a preferred control scheme, a preferred control circuit, a preferred power source and illustrative waveforms, it should be understood at the outset that the invention is not limited to the components described herein. Other circuitry and control schemes may be employed while implementing this invention.

A method and apparatus for controlling a waveform controlled short circuit welding process is described herein. A wire electrode is mechanically fed into the weldment at a relatively constant rate by a wire feeder in the waveform controlled short circuit welding process (the wire is intermittently retracted according to another embodiment). It is consumed into the weldment via a series of alternating short circuit and arc events. This process is generally referred to as short circuit welding, or controlled short circuit welding. Generally, a welding system used for short circuit welding includes at least a power source, a controller and a wire feeder, although they may be sold in separate packages.

The controlled short circuit welding process is cyclical. One cycle of the process, as described herein, begins with the beginning of a steady state arc, followed by a short circuit condition, and is completed with the beginning of another steady state arc condition. A typical cycle length is 10 msec. The electrode, and a portion of the base metal, are melted during the controlled short circuit welding process by current flowing through the electrode to the weldment. Generally, a portion of the wire material melts during the arc condition, and is transferred during the short condition.

Figure 2:
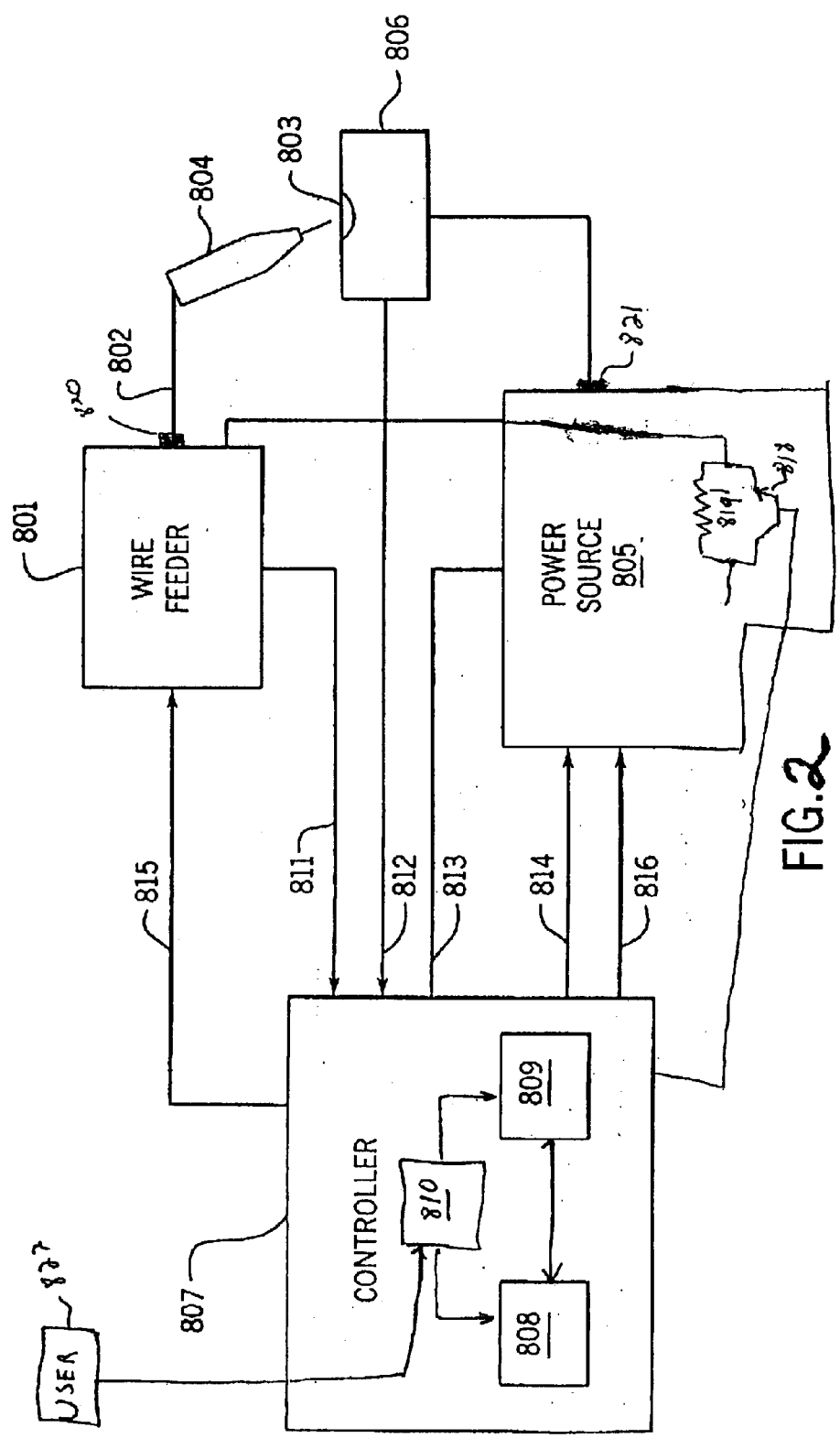
FIG. 2 is a block diagram of a controlled short circuit welding system in accordance with the present invention.

FIG. 2 is a block diagram of a waveform controlled short circuit welding system that implements the present invention. The preferred embodiment is consistent with the system of U.S Pat. No. 6,087,626, and may have power circuitry such that shown in U.S. Pat. No. 6,329,636, hereby incorporated by reference.

Generally, a wire feeder 801 provides a wire 802 through a welding torch 804 to a weldment 803. A power source 805 provides power to welding torch 804 and a workpiece 806. A controlled short circuit controller 807 includes a microprocessor 808 (with the control scheme implemented at least in part by software) in the preferred embodiment, and a DSP or other integrated circuits in alternative embodiments, an A/D and D/A interface, and an analog circuit 809. Feedback is provided to controller 807 on lines 811–813. Control signals are provided by controller 807 on lines 814–816. Controller 807 may be part of power source 805, part of wire feeder 801, power source 805 may have a separate controller, or controller 807 may directly control the power converting of power source 805.

A bypass output switch 818 and a resistor 819 are shown as part of power source 805. They are omitted, or located on wire feeder 801, or located in a separate housing in various embodiments. A user heat control input 822 may be located on the power supply housing, the wire feeder housing, the torch, or other locations accessible by the user.

Controlled short circuit controller, as used herein, is a controller that causes a power source to provide controlled short circuit power. Controller, as used herein, includes digital and analog circuitry, discrete or integrated circuitry, microprocessors, DSPs, etc., and software, hardware and firmware, located on one or more boards, used to control a device such as a power supply.

The preferred control scheme generally follows that set forth in U.S. Pat. No. 6,087,626, but other control schemes may also be used. Many of the details of the control scheme are not important to the invention, and they will not be discussed herein. Generally, the preferred control scheme uses a current command signal to drive the output current. The command signal is comprised of multiple components. One component sets the long-term current command level. Another component adjusts the current command on an real-time or short-by-short basis. Arc voltage feedback is used to determine if the desired arc length is present and to adjust the long-term command. The short-by-short current command is derived from real-time arc current feedback (rather than power) and is used to control the burn-off rate by an instantaneous, or short-by-short, adjustment of the current command.

Thus, two control loops are in simultaneous use—an arc length loop using arc voltage as feedback to set a long-term current command, and a wire burn-off loop using arc current as feedback to set a short-by-short command. The two loops are weighted differently in the preferred embodiment. Both arc voltage and arc current are used to detect, in real time, the short-clearing, and to terminate the process in a known manner.

It is easiest to understand the circuitry and algorithm used to implement the preferred embodiment by referring first to typical output voltage and current waveforms, such as those depicted in FIG. 1. The dashed lines indicate time segments which are referred to as $T_{back}$ in $T_{wet}$, $T_{rise1}$, $T_{rise2}$, $T_{dpdt}$, and $T_{hld}$. These time segments indicate when, in the current waveform, changes are effected by the algorithm.

$T_{hld}$ is an arc condition that begins at the end of the short clearing. The current is commanded to a level high enough to melt the end of the wire during $T_{hld}$. $T_{hld}$ is maintained for a duration long enough that a desired amount of heat (or energy) is input into the wire. When $T_{hld}$ ends, $T_{back}$ begins.

$T_{back}$ is a steady state arc condition. During $T_{back}$ the current is at a background level, $A_{bk}$, which is sufficient to sustain an arc. However, the background current is not of a sufficient magnitude to continue to melt the wire faster than the rate at which it is being fed into the weldment. The arc condition with a low background current ends when the tip of the wire makes contact with the weld puddle, which is denoted by the end of $T_{back}$ and the beginning of the $T_{wet}$ time. The end of the arc condition is also the beginning of the short circuit condition. This transition causes an abrupt drop in the output voltage.

When $T_{WET}$ is completed the current is commanded to increase. This portion of the current waveform is called $T_{RISE1}$. The rate of rise is selected to be a rate that insures the current level approaches the value necessary to initiate the necking of the molten interface between the wire and the weld puddle within the time required for transfer of the molten ball through surface tension effects.

The current magnitude increases until the current is commanded to a level L. Upon reaching this level, controller 807 commands a current rise at a lesser rate, during $T_{RISE2}$. This rate of current rise is maintained until controller 807 determines the short is about to clear. When the short is about to clear ($T_{dPdt}$) the current is reduced to avoid excessive spatter.

The preferred embodiment uses arc voltage to control arc length because there is a direct correlation between arc length and arc voltage. Generally, the arc voltage is compared to a setpoint. The arc length is determined to be more or less than a desired length based on whether the arc voltage is more or less than the setpoint.

Also, a feedback relating to heat input to the wire, which corresponds to burn-off rate, is derived from a current feedback signal. The interaction of the two feedback loops—voltage for arc length and current for burn-off rate provides this control scheme with a stable arc.

A control signal derived from current feedback, which corresponds to heat input to the wire and burn-off rate, provides the short-by-short control. The short-by-short control entails monitoring of the heat input into the wire. Given certain information regarding the type of wire being consumed into the weldment, the baseline rate at which heat must be input into the wire in order to maintain the burn-off rate is calculated.

The heat input into the wire is determined by treating the wire stick out as a series of small segments. The $I^2*R$ heat input into each segment is found by taking multiple samples of the $I^2*R$ feedback and summing these over a duration of time less than the short-arc period (cycle process). This sum then represents the heat input into each segment along the stick out. An array stores the heat input information so that a cumulative sum is maintained for each segment. The segment which contains the heat input information for the end of the wire is determined by going back in time an amount based upon the stick out. The sum is compared to a heat level threshold, $H_{thresh}$ and the magnitude of the current during the arc is increased or decreased in proportion to the error present.

$H_{thresh}$ is set by the user through input 822. In particular, controller 807 sets a baseline consistent with the prior art. But, the user adjusts the baseline via a control (pot, digital input, etc.) up or down by a desired percent or by a desired quantity. If more heat is desired, the user raises $H_{thresh}$, and if less heat is desired, the user lowers $H_{thresh}$. Thus, the user can directly adjust the heat content of the drops. Alternatives provide for the user to set the heat input without a baseline set by the control scheme.

The preferred embodiment provides for adjusting the duration of $T_{hld}$ to control the heat input. Alternatives include adjusting other parameters such as current rate of change, current magnitude, background magnitude, and functions thereof.

Controller 807 includes a heat control module to control the heat provided to the drops. The heat control module includes a comparator in the preferred embodiment. Heat control input 822 is provided to a threshold module. The output of the threshold module is provided to the comparator, which functions to adjust the heat input as described above.

Control module, as used herein, may be digital or analog, and includes hardware or software, that performs a specified control function. Heat control module, as used herein, is a control module that controls the heat provided to a welding drop. Heat control input, as used herein, is an input to control the heat provided to a drop. Comparator, as used herein, is circuitry or software that provides an output response to a comparison of two or more inputs. Heat provided to a drop, as used herein, is the heat provided to a drop, either in one process cycle, or over a plurality of process cycles. Threshold module, as used herein, is a control module used to set a threshold.

Other embodiments provide for the heat input control to be used with a mechanically controlled short circuit welder. Another embodiment provides the heat content to be adjusted for a plurality of drops, rather than drop-by-drop. Still other embodiments provide for the source of power to be converters and/or secondary switches.

Numerous modifications may be made to the present invention which still fall within the intended scope hereof. Thus, it should be apparent that there has been provided in accordance with the present invention a method and apparatus for controlled short circuit welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A controlled short circuit welding-type power supply comprising:
    a source of welding-type power having a control input;
    a controlled short circuit controller, having a control output connected to the control input, and including a heat control module having a heat control input, and responsive to the heat control input and to a signal, accumulated over a plurality of welding cycles, indicative of resistive heat provided to a drop; and
    a user selectable input connected to the heat control input.

2. The welding-type power supply of claim 1, wherein the heat control module further includes a comparator responsive to the signal indicative of resistive heat and the heat control input.

3. The welding-type power supply of claim 2, wherein the heat control module further includes a threshold module, that receives a signal indicative of a baseline threshold and the heat control input, and provides a threshold to the comparator.

4. The welding-type power supply of claim 2, wherein the heat control module is comprised of digital circuitry.

5. The welding-type power supply of claim 2, wherein the heat control module is comprised of analog circuitry.

6. The welding-type power supply of claim 2, wherein the heat control module is implemented with software.

7. The welding-type power supply of claim 1, wherein the source of welding-type power includes an inverter.

8. The welding-type power supply of claim 1, wherein the source of welding-type power includes a converter.

9. The welding-type power supply of claim 1, wherein the source of welding-type power includes an output bypass switch.

10. A method of controlled short circuit welding: comprising:
    providing welding-type power;
    controlling the welding-type power to be controlled short circuit power;
    receiving a user selectable heat control input; and
    adjusting the heat content of each drop in response to the user selectable heat control input and a signal, accumulated over a plurality of welding cycles, indicative of resistive heat provided to a drop.

11. The method of claim 10, wherein adjusting includes comparing the signal indicative of resistive heat and a signal responsive to the heat control input.

12. The method of claim 10, wherein adjusting further includes receiving a signal indicative of a baseline threshold and the heat control input and providing a threshold responsive thereto.

13. The method of claim 10, wherein controlling includes switching an inverter.

14. The method of claim 10, wherein controlling includes switching a converter.

15. The method of claim 10, wherein controlling includes switching an output bypass switch.

16. A method of controlled short circuit welding, comprising:

providing welding-type power;

controlling the welding-type power to be controlled short circuit power;

receiving a user selectable heat control input; and adjusting the heat content of a plurality of drops in response to the user selectable heat control input and in response to a plurality of signals, accumulated over a plurality of cycles, indicative of resistive heat provided to each of the plurality of drops.

17. A controlled short circuit welding-type power supply comprising:

a power means for providing welding-type power;

control means for controlling the power means to provide a controlled short circuit output, connected to the power means;

heat means for controlling the heat of each drop in response to a signal, accumulated over a plurality of welding cycles, indicative of resistive heat provided to each a drop, connected to the control means; and user selectable input means for setting a desired heat content, connected to the heat means.

18. The welding-type power supply of claim 17, wherein the heat means includes a means for providing a signal responsive to a comparison of the signal indicative of resistive heat and the heat control input.

19. A system for controlled short circuit welding: comprising:

means for providing welding-type power;

means for controlling the welding-type power to provide controlled short circuit power, connected to the means for providing;

means for receiving a user selectable heat control input, connected to the means for controlling; and means for adjusting the heat content of each drop in response to the user selectable heat control input and in response to a signal, accumulated over a plurality of welding cycles, indicative of resistive heat provided to each drop, connected to the means for receiving and the means for controlling.

20. The system of claim 19, wherein the means for adjusting includes means for comparing the signal indicative of resistive heat and a signal responsive to the heat control input.

21. The system of claim 20, wherein the means for adjusting further includes means for a receiving a signal indicative of a baseline threshold and the heat control input and for providing a threshold responsive thereto.

22. A system of controlled short circuit welding: comprising:

means for providing welding-type power;

means for controlling the welding-type power to be controlled short circuit power, connected to the means for providing;

means for receiving a user selectable heat control input, connected to the means for controlling; and means for adjusting the heat content of a plurality of drops in response to the user selectable heat control input and in response to a signal, accumulated over a plurality of cycles, indicative of resistive heat provided to each of the plurality of drops, connected to the means for receiving.

* * * * *